United States Patent
Solondz

(10) Patent No.: US 9,240,818 B2
(45) Date of Patent: Jan. 19, 2016

(54) SELF PROTECT FOR SHARED ACCESS SYSTEMS

(71) Applicant: Verizon Patent and Licensing Inc., Basking Ridge, NJ (US)

(72) Inventor: Max A. Solondz, New Vernon, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 46 days.

(21) Appl. No.: 14/146,369

(22) Filed: Jan. 2, 2014

(65) Prior Publication Data
US 2015/0188592 A1    Jul. 2, 2015

(51) Int. Cl.
*H04B 15/00* (2006.01)
*H04B 1/3888* (2015.01)
*H04L 5/00* (2006.01)

(52) U.S. Cl.
CPC .............. *H04B 1/3888* (2013.01); *H04B 15/00* (2013.01); *H04L 5/0062* (2013.01)

(58) Field of Classification Search
CPC ..... H04W 48/02; H04W 48/12; H04W 72/04; H04W 72/042; H04W 72/14; H04W 16/14; H04W 36/00; H04W 72/005; H04W 72/0453; H04W 8/005; H04W 36/30; H04W 72/02; H04W 74/084; H04L 1/0026; H04L 12/4625; H04L 5/001; H04L 5/0053; H04L 12/2803; H04L 12/40058; H04L 12/2834; H04L 12/40117; H04L 1/0025; H04B 17/345; H04B 2201/70701; H04B 7/2618; H04B 7/18513; H04B 7/18532; H04B 7/18565
See application file for complete search history.

(56) References Cited

U.S. PATENT DOCUMENTS

| | | | | |
|---|---|---|---|---|
| 2010/0157910 A1* | 6/2010 | Nentwig | ............... | H04L 5/0007 370/329 |
| 2014/0080535 A1* | 3/2014 | Gauvreau | ............. | H04W 16/14 455/513 |
| 2014/0185580 A1* | 7/2014 | Fang | ...................... | H04W 16/14 370/330 |
| 2014/0237547 A1* | 8/2014 | Bose | ..................... | H04W 16/14 726/3 |
| 2015/0036509 A1* | 2/2015 | Lopes | ................... | H04W 16/10 370/241.1 |
| 2015/0230255 A1* | 8/2015 | Lopes | ................... | H04W 16/02 370/329 |
| 2015/0249513 A1* | 9/2015 | Schwab | ................ | H04J 3/0638 370/278 |
| 2015/0257007 A1* | 9/2015 | Solondz | ................ | H04L 9/3234 713/154 |

OTHER PUBLICATIONS

'IEEE 802.11y-2008'. Wikipedia [online] [retrieved on Apr. 8, 2014]., IEEE 802.11y-2008. Wikipedia [online] [retrieved on Apr. 8, 2014].

* cited by examiner

*Primary Examiner* — Golam Sorowar

(57) ABSTRACT

The examples describe a self-protection feature in components of an authorized shared access system (ASAS). In the ASAS, radio frequency spectrum is shared by different users having different levels of priority when accessing the shared radio frequencies. Higher-tiered user equipment, such as radar systems, generate signals having significantly higher levels of power than the lowest tier user equipment. Exposure to the high power signals may damage the lower-tiered user equipment. The examples describe a lower-tiered access point device and a lower-tiered end user device that participate in the shared access system to communicate over the shared radio frequency spectrum under control of a shared access system manager. In response to a threat of high power signals, the access points and the end user devices are instructed to enter a self-protection mode. The self-protection is enabled by a local switch system within the access point and the end user devices.

20 Claims, 8 Drawing Sheets

100

200

300

SELF PROTECT FOR SHARED ACCESS SYSTEMS

BACKGROUND

The Federal Government has proposed making available radio frequency spectrum (e.g. 100 MHz within the 3.5 GHz range) that is currently reserved for government and military uses to commercial vendors. For example, the radio frequency spectrum that is to be shared by the Government users is in the frequency ranges typically used for military or air-traffic control radars (airborne and ship-borne), air-ground/ground-air communications, and other uses, which are often intermittent uses.

An initial proposal establishes a tiered priority access system. The first tier (Tier 1) is reserved Government and military incumbent operations who are the highest priority and the highest power-emitting users. The next tier (Tier 2) would be Priority Access/Commercial Wireless Network Providers (e.g. Verizon®, AT&T® and the like), who are proposed to have a mid-level priority, and the third tier (Tier 3) with the lowest priority would be General Authorized Access (GAA) users. The proposed spectrum sharing paradigms allow the GAA users to use low power access point (APs) devices and low-power end user devices (EUDs) to operate at one or multiple channels of the shared radio frequency spectrum, which may also include channels that are shared with these other systems.

As a result, in some cases, the shared band includes operation of dissimilar systems, including Tier 1 high power, pulsed radars. In close proximity to the military radars and other high power radiating systems, there may be a zone around these radar/other radiating systems where the radiated power level is so high as to be a 'burn-out' threat to the electronics in the GAA user's devices and systems that share the frequency spectrum with the high power system.

Hence a need exists for a self-protection mechanism to allow these GAA systems to exist in close proximity to the high powered users by not operating in the shared band during the high powered operations of the high powered users.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples of devices configured for shared radio frequency spectrum access disclosed herein relate to end user devices and accompanying access points that provide data communication services in a frequency spectrum that is shared with other users whose equipment typically emits high power signals that are capable of damaging the access points and end user devices that share the radio frequency spectrum or band or channel set.

Figure 1:
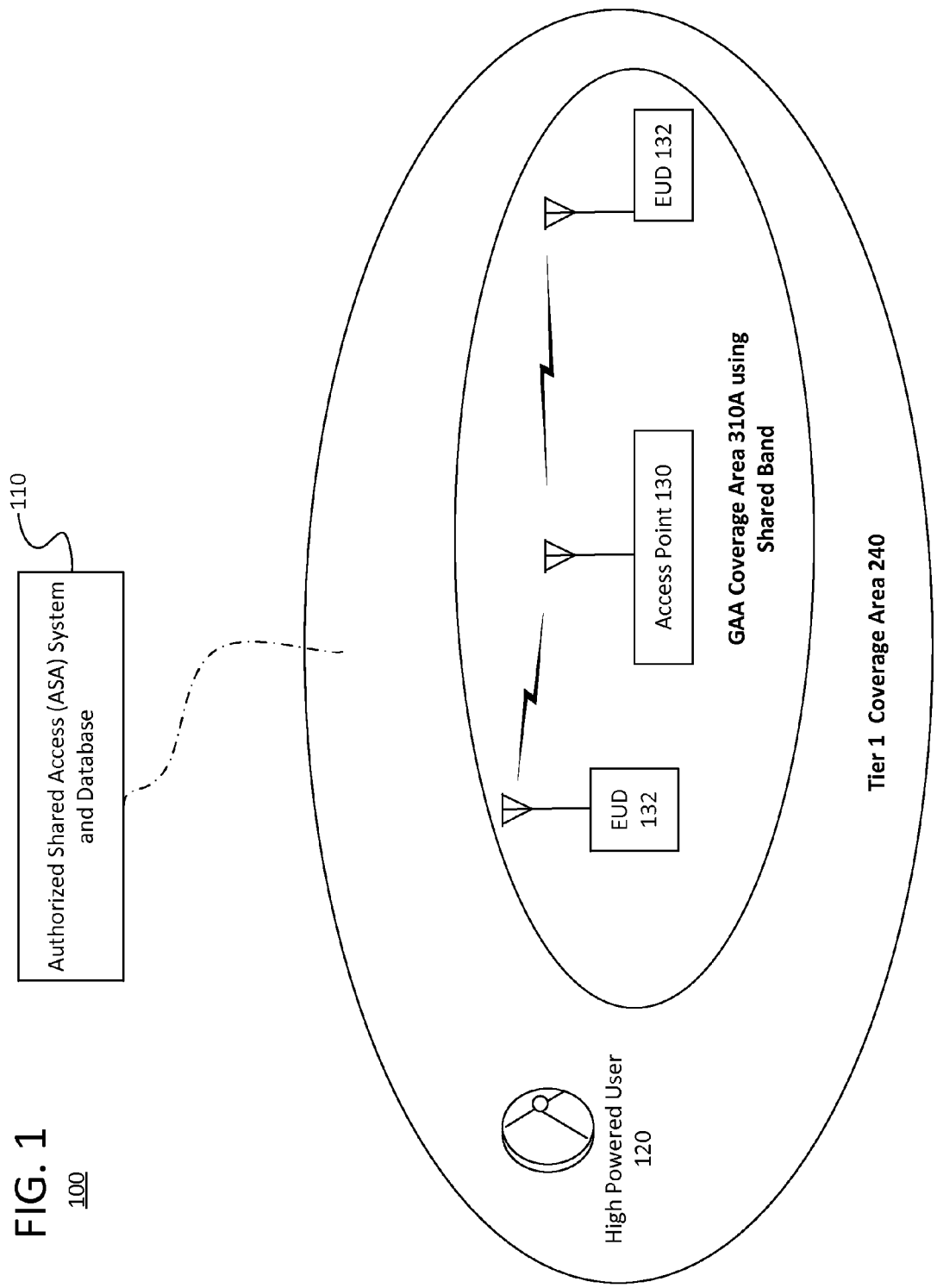
FIG. 1 is a conceptual diagram illustrating an example of an area that may allow radio frequency coverage for lower priority, lower powered users within coverage areas that also contain higher priority, higher powered users in an authorized shared access system.

Reference now is made in detail to the examples illustrated in the accompanying drawings and discussed below. FIG. 1 is a conceptual diagram illustrating an example of areas that may be provided with radio frequency coverage for lower priority, lower powered users within coverage areas that also include higher priority, higher powered users with an area covered by the authorized shared access system. For example, the Authorized Shared Access system (ASAS) 110 is a system that manages the allocation of frequency channels in the shared radio frequency spectrum band to the various Tier 2 and Tier 3 users based on the use of the higher-priority Tier 1 users. The shared radio frequency spectrum band is a frequency band, such as 100 MHz within the 3.5 GHz range, that is further segmented into frequency channels that are shared among the Tier 1-3 users under control of the ASAS 110. The ASAS 110 may be a system of one or more controllers (not shown) and one or more database(s) (not shown), all of which may exchange data with the various Tier 1-3 users. The ASAS 110 database may be populated with data regarding the expected use of the shared radio frequency spectrum. For example, an ASAS database user data record may include fields from which can be determined information, such as Tier 1 user XYZ is using frequency channel 4 from 1800-2100 on Feb. 24, 2014 at power level 9, or other similar data. By referencing to the database, the ASAS 110 is able to determine the location and mode of operation of the high priority, high power users, which can be used to protect the lower tiered users from the high power signals. The location and mode of operation information is useful for not only determining protection zones, but also governing which frequencies are to be allocated to each device to eliminate the possibility of interference between devices in all three tiers. The one or more controllers, such as an ASA manager 16 shown in FIG. 2, communicate with the database to determine the availability of spectrum to be shared and the locations in which the spectrum may be shared. Based on this information, the ASAS 110 can make determinations of coverage area 310A size and duration within the larger Tier 1 coverage area 240.

The data base in the ASAS 110 includes information and rules related to the use of the shared spectrum in each of the areas. The ASAS 110 monitors the different users' application parameters (identities, system type, transmitter power level, system location, receiver sensitivity, antenna gain, and the like) and administratively determines which systems can operate by governing permission to use appropriate channels within the shared band. The higher Tiered users (Tier 1 government or military) have highest priority, and are assumed to have full access whenever needed or desired. The Tier 2 Licensed Priority Access users may have intermediate priority, and general authorized access (GAA) Tier 3 users, that may be either licensed or unlicensed, have lowest priority. For example, the Tier 3 users may be unlicensed, which means that any Tier 3 user may use the available spectrum without receiving any protection from interference from other Tier 3 users. Examples of GAA users may be a retail store, a local delivery truck service, hand-held radio service, a rural town or rural county non-essential governmental service entities (e.g. animal control, social services, and the like), small businesses, colleges, universities, individuals or others that need or want only intermittent connectivity to a data communication network. In all cases, the ASAS 110 knows each user location.

For example, the ASAS 110 database (not shown) may include information related to spectrum use of the high powered user 120 in the Tier 1 coverage area. For example, the database may have records that indicate when (e.g. time and date) high powered user 120 will be emitting high powered energy, the frequency channels that will be used during the emissions (e.g. channels 2, 4 and 8; channels 1 and 9; or a single channel), the duration of the emissions (e.g. 1 day, 3 hours, variable times between 10 am and 12 pm, seconds, milliseconds or any other suitable intervals).

The lower powered, Tier 3 devices include front end (receiver front end including: antenna, band pass filter and low noise amplifier) circuits and the back end (transmitter back end including: antenna, band pass filter, and power amplifier) circuits in the illustrated access point (AP) 130 and end user devices (EUD) 132 that are susceptible to receiving high energy pulses (e.g. radar) depending upon how close the victim AP 130 or EUD 132 is to the high powered device 120 emissions.

The ASAS 110 is configured to implement spectrum sharing paradigms that may allow the Tier 3 GAA set of users (e.g. AP 130 and EUDs 132) to share a frequency band by having access to allocated radio frequency channels along with Tier 1 (government and military incumbent operations) and Tier 2 (Priority Access/Commercial Wireless Network Providers) without interfering with the Tier 1 and Tier 2 users use of the shared radio frequency spectrum.

The ASAS 110 may have stored in the ASAS database information related to when the Tier 1 and Tier 2 users are scheduled to use certain frequency channels (which may be all available channels, only a select few channels from all of the available channels or even a single channel) of the shared radio frequency spectrum in a particular coverage area location. For example, the ASAS 110 database may include the known and expected future locations and modes of operation of the high priority, high power users through data connections with government/military (Tier 1) and priority access/commercial wireless network providers (Tier 2) data systems. The ASAS 110 database is a secure database protected by encryption and security protocols. Of course, the known and future locations of some government and military, Tier 1, high powered users may be sensitive information, and, as a result of the need for secrecy/security, the ASAS 110 may receive an urgent request for use of spectrum from the Tier 1, high powered users. Similarly, data may be included in the ASAS 110 database for the Tier 2 users. Based on the data in the ASAS 110 database regarding the Tier 1 and Tier 2 high powered users, the ASAS 110 may assign respective areas, e.g. coverage areas 310A in FIG. 1 within Tier 1 coverage area 240. Under control of the ASAS 110, the shared radio frequency spectrum may be shared in respective coverage areas in a more efficient and non-interfering manner that also protects the Tier 3 user equipment, such as access point (AP) 130 and end user devices 132.

In the example of FIG. 1, the access point (AP) 130 and end user devices 132 are examples of an implementation that provides shared radio frequency spectrum coverage for lower priority users in an authorized shared access system. Generally, the ASAS 110 has determined that the Tier 3 coverage areas, such as 310A, are available for non-interfering use of the shared radio frequency spectrum (i.e. AP 130 will not interfere with the high powered user 120. The AP 130 is informed of the availability of spectrum in the coverage area 310A including the frequency band in which the AP 130 is to operate, and begins operating in the indicated frequency band to provide data service to the EUDs 132.

However, as mentioned above, the ASAS 110 may also instruct the AP 130 and EUDs 132 to stop transmitting because a higher priority user (e.g. Tier 1 military users) needs the channel for high powered emissions, such as a pulsed radar, or will be emitting high powered radio frequency in a channel(s) adjacent to the channel that the AP 130 and EUDs 132 are currently using to communicate. The ASAS 110 may have significant advanced notice (e.g. months or several days' notice) that a Tier 1 user will be in the vicinity, such as coverage area 240, of Tier 3 devices, and will need the entire coverage area 240 for the Tier 1 activities. Tier 1 activities may include the use of high powered signals within the frequency bands of the shared radio frequency spectrum that may potentially damage the Tier 3 devices. Alternatively, the ASAS 110 may have little, or substantially no, advanced warning of the Tier 1 user's high powered use of a channel allocated to the Tier 3 AP 130 and EUDs 132. In the case of significant advanced notice, the ASAS 110 can provide a schedule of when the AP 130 and EUD 132 should shutdown, while in the case of abrupt notice, a self-protection instruction may be transmitted moments before the Tier 1 user takes control of the shared spectrum channel allocated to the AP 130 and EUD 132 with a high powered signal that potentially overpowers the AP 130 and EUD 132. As a result, the Tier 3 APs and EUDs are configured to prioritize responding to self-protection instructions provided by the ASAS 110.

Figure 2:
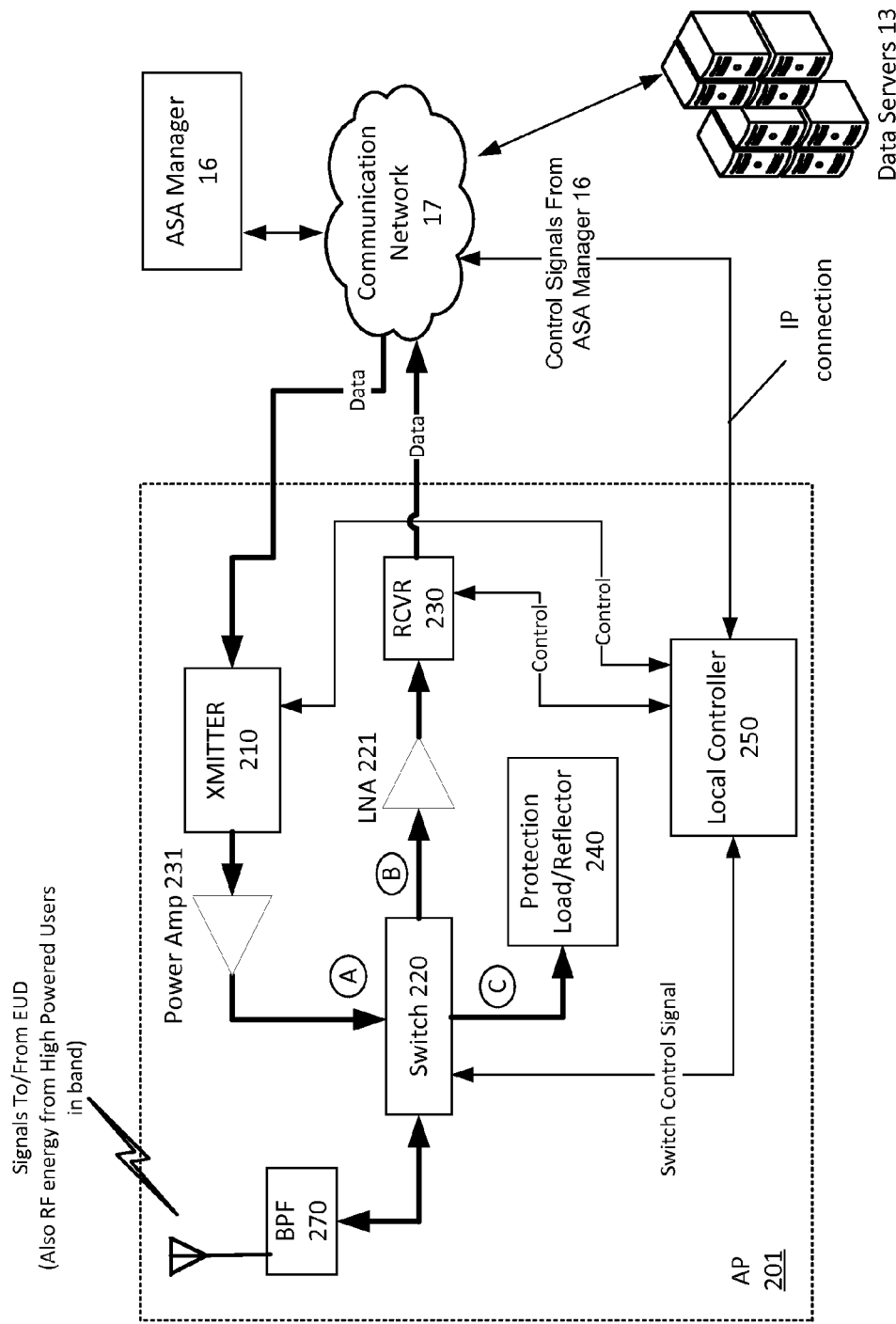
FIG. 2 is a high level functional block diagram of an example of an Access Point (AP) in an authorized shared access system for providing access to a shared radio frequency spectrum for low priority users.

FIG. 2 is a high-level functional block diagram of an example of a system including an access point for providing access to shared radio frequency spectrum that is configured to protect itself from high powered signals. In the illustrated example, the system 200 is implemented using a time division duplex (TDD) signaling implementation, in which a time divisions within a single radio frequency are used to communicate bi-directionally in both an uplink (from the EUD (not shown) to the AP) and in a downlink (from the AP to the EUD (not shown)). The shared radio frequency spectrum access system 200 may include an access point (AP) device 201, a communication network 17, an authorized shared access (ASA) manager 16 and data servers 13. The data servers 13 provide data and other services to devices (e.g. AP 201 and end user devices (EUDs) (not shown)) and systems that are connected to, and that access the communication network 17. The ASA manager 16 is also connected to communication network 17. The ASA manager 16 has access to the database and other resources of the ASAS 110. The ASA manager 16 may determine a frequency band that will be allocated to the requesting AP 201 by selecting from the available frequency bands in the shared radio frequency spectrum.

The AP 201 is an access point for end user devices (EUD) (not shown) to communicate with the communication network 17 and the data servers 103. The communication network 17 may be any form of data network, such as the Internet, an intranet, a campus-wide LAN, metropolitan LAN or other form of data network that allows an external controller, such as ASA manager 110, to communicate with the AP 201.

The AP 201 includes a transmitter 210, a power amplifier 231, a multiplexing switch 220, a receiver (RCVR) 230, a low noise amplifier (LNA) 221, a local controller 250, and a band pass filter 270. Under control of the local controller 250, the AP 201 performs routing functions similar to those of, for example, a Wi-Fi router or other type of signal router, in the channel frequency allocated by the ASA manager 16.

Data signals, shown by the heavier lines labeled "Data," are delivered from the communication network 17 via data connections (not shown) to the AP 201. The data (e.g. digital media content or web services) from the data servers 103 and may be provided through the communication network 17 to the AP 201 via a wired (e.g. coaxial cable, fiber optic cable or otherwise hard-wired connection) or wirelessly, via a cellular connection, Wi-Fi, Bluetooth or some other wireless format in a frequency range outside the shared radio frequency spectrum. The AP 201, in an example of time division duplex (TDD) communications, simply transmits data, via the downlink transmission path that includes the transmitter 210, the switch 220, and the band pass filter (BPF) 270, and a wireless airlink or air interface, to an EUD (not shown). The AP 201 is also configured to receive uplink data from the EUD on the same channel (assuming a TDD implementation) as the AP 201 through a receive channel that includes the airlink to the antenna coupled to the BPF 270, the BPF 270, the switch 220 (configured to a receive state (i.e. State B) by a control signal from the local controller), LNA 221, receiver 230, and out through the AP data connections to the data network and data servers 103.

Of course, multiple EUDs may connect to a single AP, such as AP 201. Although not described in detail, the local controller 250 is configured with processing capability to manage the routing of data transmissions between the data/communication network 17 and multiple EUDs according to known routing schemes and systems. The AP 201 local controller 250 also distributes control signals to the transmitter 210 and the receiver 230 within the AP 201 based on signals received from the ASA manager 16. The ASA manager 16 is coupled to the communication network 17, and transmits and receives control signals to/from multiple APs, such as AP 201, connected to the communication network 17, or other networks (not shown) that connect to the communication network 17. The AP 201, in an example, also has a separate 'always on' connection to the ASA manager 16 via an Internet Protocol (IP) connection between the local controller 250 and the communication network 17, which may be wired (such as Ethernet, coaxial cable or fiber optic) or wireless (via another band of operation on CDMA or LTE, via Wi-Fi, Bluetooth, or other wireless protocol) to support connection of the AP 201 to the Internet via communication network 17.

In an example, the AP 201 through connections to the communication network 17 is configured to receive control signals from the ASA manager 16. The distribution of the received control signals within an access point device or end user device is managed by the local controller 250. For example, the local controller 250 provides control signals that cause the transmitter 210 and receiver 230 to respectively transmit downlink signals and receive uplink signals in the same frequency channel (in a TDD implementation) or separate respective uplink and downlink frequencies (in an FDD implementation). In response to signals received from the ASA manager 16 over the wired or wireless IP connection with the communication network 17, the local controller 250 generates a switch control signal that places the switch in one of three positions. The three positions, labeled A, B and C, are a downlink transmit position (i.e. A), a uplink receive position (i.e. B) or a self-protect mode position (i.e. C). For example, the switch 220 may be a solid state switch suitable for handling large power surges and that responds to control inputs. As an example, the switch 220 may be a single-pole triple-throw (SP3T) multiplexer switch that, in response to a control signal, switches between connections to the transmitter 210, the receiver 230, and the protection load/reflector 240. When switched to the protection load/reflector 240, the circuit path may lead either to a dummy load (absorptive) or an open (reflective) circuit. In either case, the power amplifier 231 and transmitter 210, and the LNA 221 and receiver 230 are protected from high power surges that may be associated with the Tier 1 high powered users.

An example of the operation of the AP 201 for implementing a self-protection mode will now be discussed in more detail. As mentioned above, the front end circuits (i.e. circuits in the receiver 230 branch of AP 201) and the back end (i.e. circuits in the transmitter 210 branch of AP 201) are susceptible to damage from high powered signals being received at the antenna of the BPF 270.

An external manager, such as ASA manager 16, may send signals to the local controller 250 to indicate the mode of operation in which the access point 201 should be operating. For example, the access point 201 device may operate in one of the following Operational Modes: (1) Normal Operation: TDD/FDD transmit or receive operation permitted on the allocated channel within the shared radio frequency spectrum; (2) Reception Only Operation: TDD/FDD transmission operation is not permitted on the assigned (or allocated channel) (or any) channel but the AP is permitted or requested to perform "spectrum sensing" only operation (receive only), which is an operational state in which the receiver detects signals or signal strengths on one or more indicated channels; or (3) Self Protection: a self-protection mode to protect the AP circuitry, such as LNA 221, receiver 230, power amplifier 231 and transmitter 210 from harmful effects of high power interference from the high priority, high power users, such as user 120.

The local controller 250 is informed by the ASA manager 16 that a frequency channel is available is in the shared radio frequency spectrum. The local controller 250 may generate a control signal to place the switch 220 in state A, may cause the transmitter 210 to tune to the assigned (or allocated) channel in order for the AP 201 to transmit downlink signals to any EUDs that connect to the AP 201 access to the communication network 17. Similarly, the local controller 250 may generate a control signal to place the switch 220 in state B, may cause the receiver 230 to tune to the assigned (or allocated) channel in order for the AP 201 to receive uplink signals from any EUDs that connect to the AP 201 access to the communication network 17.

In Operational Mode 1 (e.g. downlink signals are transmitted by the AP 201 to the EUD, or uplink signals are received by AP 201 from the EUD, such transmission or reception on the allocated channel within the shared radio frequency spectrum), the local controller 250 is managing an ongoing communication session between the communication network 17, the AP 201 and an EUD (not shown, but described in more detail later). The local controller 250 manages the transfer of data between the communication network 17 and the EUD by transitioning the AP 201 between downlink transmission and uplink reception by applying control signals to the switch 220 that change the state of the switch 220 in order to connect to either A or B.

For example, when transmitting downlink data from the communication network 17 to an EUD, the local controller 250 generates a control signal (i.e. a transmit control signal) that is applied to one of one or more control inputs (e.g. connections or terminals) to the switch 220. In response to the applied transmit control signal, the switch 220 changes state (to State A or "On") to complete a transmitter signal path. State A is a switch 220 configuration that enables the data received from the communication network 17 to be transmitted by the transmitter 210 via a transmitter signal path (transmitter 210→power amplifier 231→switch 220→the BPF 270→antenna) and over-the-air to the EUD.

In an example, the ASA manager 16 will not instruct the AP 201 to enter operational mode 1 or operational mode 2 if there is more than a remote probability (e.g. >5%) that the AP 201 will be exposed to a high powered user.

In order to receive uplink data from the EUD at the AP 201, the switch 220 is changed to state B. State B is a switch 220 configuration that enables a receiver signal path through which data is received from the EUD is delivered to the communication network 17. In other words, an uplink reception signal path is formed when the switch is in state B. The local controller 250 generates a control signal that is applied to one of the several control inputs to switch 220, and causes the switch to complete the receiver signal path. The receiver signal path includes the antenna, BPF 270, the switch 220, the LNA 221 and the receiver 230 and the AP 201 connections to the communication network 17.

When the AP 201 is communicating with an EUD to provide the EUD with access to the communication network 17, the local controller 250 will frequently instruct the switch 220 to switch between state A (downlink transmit) and state B (uplink receive).

When the AP 201 is receiving uplink signals and the switch 220 is in state B, the AP 201 does not generate any signals that can interfere with other higher tiered devices in the vicinity of the AP 201. However, the AP 201 can interfere with other users' devices operating within the shared radio frequency spectrum when the AP 201 is transmitting signals in, or nearby, in the frequency band (e.g. the channel spacing is too close) to, a channel allocated to another user (e.g. a Tier 1, 2 or 3 user). To assist the ASA manager 16 in mitigating interference with other devices, the external manager, i.e. the ASA manager 16, has the location of the AP 201 stored in the ASAS 110 database, or is able to determine the location of the AP 201, for example, from a position determining device on the AP 201, such as a GPS receiver (not shown). The ASA manager 16 uses the locations of the devices that are sharing frequencies in the shared radio frequency spectrum and the device's signal power levels to develop a signal propagation model. When allocating frequency channels in which the AP 201 and other APs will communicate, the ASA controller 16 may refer to the propagation model(s), the ASAS 110 database for the location of other Tier 1, 2 or 3 devices, and the location of the AP 210 provided by the AP 210.

At times, the propagation model(s) may need to be updated, or the ASAS 110 may wish to determine the amount of signal traffic on one or more possible candidate channels in the shared radio frequency spectrum, for example, to determine future channel allocations. As a result, the ASA manager 16 may instruct the AP 201 to assume Operational Mode 2 configuration in which the switch 220 is maintained for a period of time in state B. The operational mode 2 configuration, as used in this example, is a "spectrum sensing" mode ('sniffing') in which the receive path (i.e. antenna→BPF 270→LNA 221→receiver 230) is active, and the AP 201 receives signals on one or more frequencies in order to sample the power levels detected from other nearby users. During normal TDD (or FDD) operation, the AP 201 receives signals on a one uplink frequency that is allocated to the AP 201 by the ASA manager 16. For example, the ASA manager 16 may access the database of ASAS 110 to determine if there is any scheduled, or potential unscheduled high powered user activity (i.e. a high power user is expected in the vicinity but the exact time is uncertain or variable), use of the frequency allocated to the AP 201 in the known vicinity of the AP 201. In more detail, the local controller 250 may generate a switch control signal in response to control signals from the ASA manager 16. The local controller 250, for example, applies the switch control signal (i.e. receiver control signal) to switch 220, which in response assumes a receiver operational state (state B), and the AP 201 begins receiving signals on one or more candidate channels in the shared radio frequency spectrum. The receiver 230 detects the signals or the signals' power levels on the respective channel or channels indicated by the ASA manager 16, and provides the detected signals or detected signal strength levels to the ASA manager 16 via communication network 17. The ASA manager 16 may process the data to obtain the information (e.g. signal strengths, such as received signal strength indication (RSSI), of signals transmitted by other Tier 1, Tier 2, or Tier 3 users that are nearby) needed to update the propagation models or determine frequency allocations.

When a higher power (e.g. Tier 1 military user of shipborne radar) user needs access to a frequency channel allocated to the AP 201 or may otherwise emit high powered signals that may damage the AP 201, the ASA manager 16, in order to prevent high power user from damaging the AP 201, forwards an access point protect signal to the AP 201. The local controller 250 receives the access point protection signal from the external ASA manager 16 via the communication network 17, and in response, generates a protect control signal.

However, before the AP 201 can protect the AP 201 circuit component, the AP 201 must instruct any EUDs connected to the AP 201 to protect themselves. So, for example, prior to applying the generated protect control signal to the switch 220, the local controller 250 generates a control signal (i.e. EUD warning signal) and instructions that are sent to the respective EUDs via the downlink transmission path and by the transmitter 210. The transmitted instructions cause the transmitter 210, for example, if transmitting, to cease transmission of the current data signals to the EUD, and to transmit the provided EUD warning signal to the connected EUD, so the EUD can also enter a self-protect mode. The EUD may respond with an acknowledgement indicating that the EUD received the EUD warning signal. After either sending the EUD warning signal or receipt of the EUD acknowledgement, the local controller 250 applies the protect control signal to the AP 201 switch 220 control input that causes the switch 220 to transition to state C and Operational Mode 3, the self-protect mode.

In Operational Mode 3, also referred to as the 'self-protection mode,' the AP 201's local switch 220 opens (i.e. disconnects) both the transmitter signal path and the receiver signal path from the antenna and band pass filter. The signal path created by the Operational Mode 3 is a protect signal path. In other words, the AP 201 is switched "OFF," and the AP 201 can no longer wirelessly communicate with the EUD device. In Operational Mode 3, the switch 220 has a configuration that either absorbs or reflects the energy from the high power signal. In order to dissipate any energy in Operational Mode 3, the switch 220 may connect a protection (absorptive) load in the circuit path with the more rugged passive band pass filter and the antenna components. The protection load is, for example, an impedance, such as a resistor or other resistive device, that has a first terminal and a second terminal. The first terminal of the protective load is coupled to the switch 220 and the second terminal is coupled to a ground connection. The impedance value may be substantially equal to the transmitter or receiver input impedance. Alternatively, instead of connecting to a protection load, the switch 220 may simply switch to an open circuit, which will reflect any energy received by the antenna and BPF 270 back out through the antenna for dissipation in the air. The protection signal path includes either a protection load (absorptive) or a reflective, open circuit 240 as well as the antenna, switch 220 and BPF 270.

Figure 3:
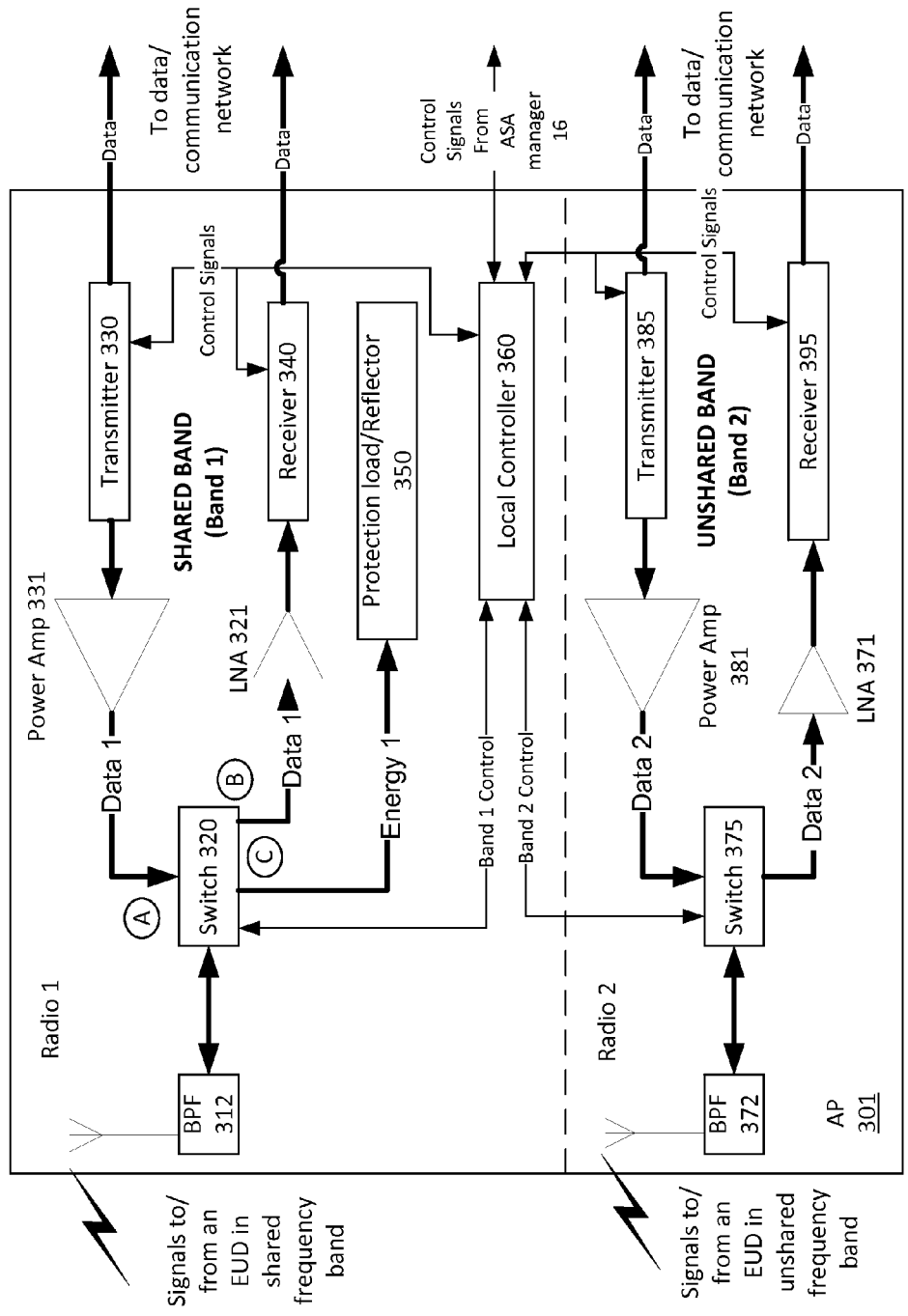
FIG. 3 is a high-level functional block diagram of another example of an access point in an authorized shared access system for providing access to both the shared radio frequency spectrum for low priority users and also other frequency bands.

Afterwards, when the high power (e.g. ship borne or airborne radar system) user ceases to use the channel in the shared radio frequency spectrum or when high power user (e.g. the ship or the airplane) has moved a safe distance away, the ASA manager 16 may generate another control signal indicating to the local controller 250 that AP 201 can return to normal operations (Operational Mode 1 with downlink transmission and uplink reception on authorized channels) or may enter Operational Mode 2, i.e. spectrum sensing on candidate channels. When assuming normal operations, the AP 201 may begin a procedure for receiving a new channel allocation from the ASA manager 16, Other examples are envisioned, such as an AP that can take advantage of the availability of the shared radio frequency spectrum, but can also maintain communication with an EUD even when a high power user needs access to the frequency channel that the AP is using. For example, the AP may have another radio that communicates with an EUD in another, unshared band. An example of such an AP is described with reference to FIG. 3. FIG. 3 illustrates an example of an AP that operates both in the shared frequency band of the shared radio frequency spectrum and also in an unshared band that is unaffected by the high power users' use of the shared frequency band.

To enable the AP 301 to operate in two different bands, two radios, radio 1 and radio 2, under control of a single local controller 360 are used. For example, radio 1 operates in the shared band (Band 1) and radio 2 operates in the unshared band (Band 2). Radio 2, which operates in Band 2, is unaffected by the high power (or energy) generated by the Tier 1 high power users. As a result, radio 2 is able to operate without interference or damage in the presence of the Tier 1 high power user.

Radio 1 of AP 301 is implemented with a configuration similar to AP 201 of FIG. 2 described above. For example, radio 1 includes similar components as AP 201, such as a band pass filter (BPF) 312 connected to an antenna, switch 320 as well as other components that perform additional functions. For example, connected to a first signal input (indicated by the A) of the switch 320 are the transmitter 330 and the power amplifier 331 (i.e. transmitter signal path). The switch 320 responds to a transmit control signal from the local controller 360 to form the transmitter signal path. While connected to a second signal input (indicated by the B) of the switch 320 are the receiver 340 and the low noise amplifier (LNA) 321 (i.e. receiver signal path). The switch 320 responds to a receiver control signal from the local controller 360 to form the receiver signal path. And, connected to a third signal input (indicated by the C) of the switch 320, is the protection load/reflector 350 (i.e. protection signal path). The protection signal path includes either a protection load (absorptive) or a reflective, open circuit 350 as well as the antenna, switch 320 and BPF 312. The switch 320 responds to a protect control signal from the local controller 360 to form the protection signal path.

The switch 320 also has control inputs connected to the load controller 360 for received control signals for controlling the switching between the three signal inputs. The transmitter 330 and the receiver 340 are connected to a data/communication network (not shown). The transmitter 330 and the receiver 340 are configured to receive and transmit data under control of the local controller 360 between an EUD communicating with the AP 301 in a shared frequency band and the data/communication network. The operation of radio 1 is substantially the same as the operation of the AP 201, and as such a detailed discussion of the operation of radio 1 will not be provided.

Meanwhile, radio 2 is configured for communication in an unshared radio frequency band, such as CDMA, LTE, Wi-Fi, Bluetooth, or some frequency other than the frequency bands of the shared radio frequency spectrum. In an example, use of radio 2 may be on a subscription basis, and, as such, a user of AP 301 may incur charges that require payment for using radio 2 for purposes, other than emergency purposes. As a result, the local controller 360 may be configured to use radio 1 whenever a shared frequency band is available. Radio 2 is also controlled by controller 360. Radio 2, for example, includes an antenna, a band pass filter 372, a switch 375, a transmitter 385 coupled to power amplifier 381, and a receiver 395 coupled to a low noise amplifier 371. Similar to the transmitter 330 and receiver 340, the transmitter 385 and receiver 395 are configured to receive and transmit data under control of the local controller 360 between an EUD communicating with the AP 301 in the unshared frequency (band 2) and the data/communication network. For example, switch 375 may be a TDD diplexer-type switch that transitions back and forth between a transmission position (i.e. coupling the transmitter 385 via the power amplifier 381 to the BPF 372 and the antenna) to a receive position (i.e. coupling receiver 395 via the LNA 371 to the BPF 372 and the antenna) in response to control signals from the local controller 360.

The local controller 360 has a connection to the ASA manager 16 for receiving control signals from the ASA manager and for delivering data, such as spectrum sensing data, to the ASA manager 16. The connection may be through a wired or wireless connection to the communication network. For example, the ASA manager 16 may connect to the local controller 360 to inform the local controller 360 that a frequency band is available for use from the shared radio frequency spectrum. In addition, the ASA manager 16 may provide indications of frequency band allocations and the like to the local controller 360.

For example, when a high power user (e.g. Tier 1 military ship-borne radar user) needs access to a frequency channel allocated to the AP 301 or may otherwise emit high powered signals that may damage the AP 301, the ASA controller 16 forwards an access point protect signal to the AP 301. As, in AP 201, the AP 301 local controller 360 issues control signals to the transmitter 330 to transmit an EUD warning signal to the respective EUD(s) connected to the AP 301, and also issues a protect control signal to the switch 320 to cause the switch to transition to state C. In state C, the switch connects the protection load/reflector 350 to the antenna via the BPF 312, and disconnects both the power amplifier 331 and LNA 321 from the antenna, thereby protecting the power amplifier 331 and LNA 321 from the high power signals.

Of course, multiple EUDs may connect to a single AP, such as AP 301. Although not described in detail, the local controller 360 is configured with processing capability to manage the routing of data transmissions between the data communication network and the multiple EUDs according to known routing schemes and systems. In some examples, the AP 301 may not know the configuration of EUD that has connected to the AP 301. In which case, since radio 2 of AP 301 is unaffected by the high power user, prior to sending the EUD warning signal mentioned above, the local controller 360 instructs the transmitter to send a signal to all of the EUDs notifying the EUDs that the AP 301 is configured with multiple communication bands. The instruction from the local controller 360 may include an AP identifier (e.g. a web address, a cellular identifier, or the like) that any EUDs configured with an unshared band can use to establish a connection with the AP 301 via radio 2.

Once the local controller 360 applies the protect control signal to the switch 320, the local controller 360 begins managing the communication of radio 2 via the switch 375. In an example, the local controller 360 may apply a receive control signal to the switch 375, which couples the receiver 395 to the antenna. In this state, the AP 301 is detecting signals in the shared band (Band 2). Any EUDs that are configured to communicate with an AP in the unshared band may request access to the AP 301 over the unshared band. When provided access to the AP 301, the EUDs may obtain data through the AP 301 from the data/communication network over the unshared band.

The local controller 360 may continue to receive status updates from the ASA manager 16 regarding available frequency channels in the shared radio frequency spectrum. After some time, the high power user may stop using the frequency channel in the shared radio frequency spectrum. If a frequency channel becomes available in the shared band (Band 1), and the local controller 360 receives a notification of the available frequency channel from the ASA manager 16, the local controller 360 may instruct the transmitter 385 in the unshared band (Band 2) to transmit through Band 2 an identifier of the available channel frequency in the shared band to the EUDs connected to the AP 301. After some time, the local controller 360 may begin to transition operation from the Band 2 frequency to the available frequency channel in the shared band (Band 1).

In another example, the multiband AP 301 may communicate at all times with a multiband EUD, such as EUD 501, using both the shared and unshared bands. In the example, the AP 301 may be configured to use the shared band (band 1), when a frequency channel is available, to transmit data, and use the unshared band (band 2) for exchange of control signals between, for example, the local controller 360 of AP 301, the local controller 560 of the EUD 501, and/or the ASA manager.

As will be described in more detail with reference to FIG. 4, an EUD may be configured to emerge from the self-protect mode after some time period, and request access to an AP, or simply, enter the previously described "spectrum sensing" mode (Operational Mode 2) in response to an instruction that an AP is broadcasting in an allocated frequency channel in the shared radio frequency spectrum. To accommodate EUDs with this configuration, the local controller 360 may generate a transmit control signal to place the switch 320 in state A, may cause the tuning of the transmitter 330 and receiver 340 to the allocated frequency channel, and also generate a status update signal (e.g. a beacon that is interpreted by an EUD receiver as an allocated frequency channel in the shared radio frequency spectrum) that is passed to the transmitter 330 for transmission to any EUDs that may want access to the data/communication network.

Figure 4:
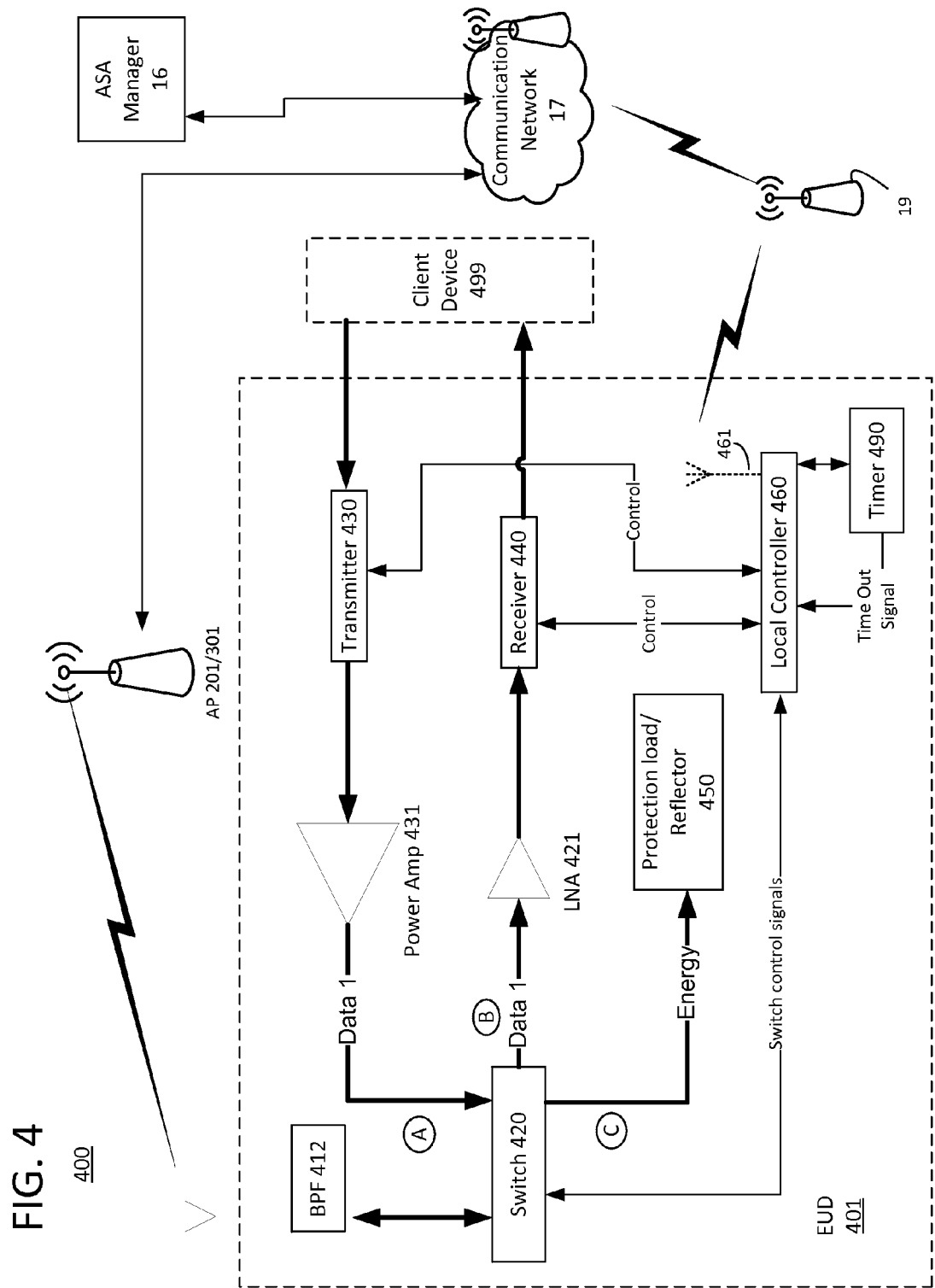
FIG. 4 is a high-level functional block diagram of an example of an End User Device (EUD) that utilizes the shared radio frequency spectrum in an authorized shared access system.

FIG. 4 is a high-level functional block diagram of an example of an end user device that utilizes the shared radio frequency spectrum in an authorized shared access system. The system 400 includes end user device (EUD) 401, AP 201 or 301 an alternative status signal source 17, a communication network 17 and an ASA manager 16. The system 400, in an example, connects to a client device 499. The client device 499 may be a device, such as an appliance, a tablet computer, a laptop computer, desktop computer, a gaming device, a media player, a window alarm, a door alarm, another AP, such as AP 501, or the like. The EUD 401 may be in the form of a dongle connectable to a data port (e.g. a universal serial bus (USB) port, a SD card reader, or a mini-USB port) of the client device 449, or may be an integrated circuit board in the client device 499. The client device 499 may be coupled to the EUD 401, which facilitates the connection of the client device 499 to the AP 201/301 and connection to the communication network 17. In other examples, the EUD 401 may be a monitoring device, such as a security device that transmits a signal in response to a change in conditions, such as an opening of a window or door. Or the EUD monitoring device may be continuously supplying data from the source to the network 17, as in the case of a health care monitoring device. In another example, the EUD 401 may only supply data to a client device 499 from the network 17, such as a clock, a stock ticker, a sports scores ticker, and the like.

As mentioned above with respect to FIGS. 2 and 3, the ASA manager 16 controls the AP 201/301 to connect to the EUD 401. The EUD 401 includes an antenna, a band pass filter 412, a switch 420, a low noise amplifier (LNA) 421, a power amplifier 431, a transmitter 430, a receiver 440, a protection load/reflector 450, a local controller 460 and a timer 490. Note that some of the components of the EUD 401 may be combined together. For example, the local controller 460 may include circuitry or software that can perform the functions of the timer 490.

In the example of a monitoring device, where the EUD and client only supply data to the network (source), the receiver 440, low noise amplifier (LNA) 421 and the associated wiring may be omitted from the EUD 401. This is a transmitting uplink-only device. Similarly, where the EUD and client only acquire data from the network (sink), such as a sports scores ticker, the EUD 401 may omit the power amplifier 431, the transmitter 430 and the associated wiring. This is a receiving downlink-only device. These are examples of one-directional devices. The EUD 401 has a configuration similar to AP 201, but performs some functions differently. For example, when the AP 201 is in the uplink receive mode, the EUD 401 is in the transmit mode and transmitting uplink data to the AP 201. Similarly, when the AP 201 is in the downlink transmit mode, the EUD 401 is receiving downlink communication network 17 data transmitted by the AP 201 (or alternatively, receiving control signals, such as self-protect signals or signals indicating an available frequency channel).

The control signals from local controller 460 for transitioning switch 420 to the different switch states (e.g. A, B and C) may be the same as those used in AP 201. A difference between the control signals used in AP 201 and the control signals used in EUD 401 are the events that trigger the generation of the respective control signals. Accordingly, the triggering events will be described in detail, but the details of the control signal generation in the EUD 401 will not be described in the detail provided with the description of AP 201 in FIG. 2.

For example, during normal operation, the EUD 401 is coupled to the client device 499 at the data outputs of the EUD 401 and connected wirelessly via the antenna from the BPF 412 over-the-air to the AP 201/301. The EUD 401 receives downlink communication network 17 data via the AP 201/301, and delivers the data to the client device 499. The communication network 17 data is received as downlink signals (in the present example as time division duplex (TDD) signals) in an allocated channel within the shared radio frequency spectrum. The EUD 401 also transmits uplink data from the client device 499 for delivery to remote devices/servers connected to the communication network 17 via the local access point.

The receiver signal path includes the antenna coupled to the BPF 412, the switch 420, the LNA 421, the receiver 440 and the EUD output to the client device 499. The downlink receiver signal path may also include a circuit path from the receiver 440 to the local controller 460 since control signals received from the AP 201/301 are received on the receiver signal path.

The uplink transmitter signal path includes an EUD input from the client device 499, the transmitter 430, the power amplifier 431, the BPF 412 and the antenna. The transmitter signal path may also include the control signal input from the local controller 460 to the transmitter 430 for transmitting various control and acknowledgment response signals to the AP 201/301.

As mentioned above, the channels that are used to deliver the data from the communication network 17 to the client device 499 are shared with Tier 1 users whose equipment (e.g. radar system) generates high power signals in the frequency channel, or in nearby frequency channels, that could potentially damage components in the EUD 401, such as the LNA 421 and receiver 440 or power amplifier 431 and transmitter 430. As a result, the EUD 401 must assume a self-protection mode when a high power user is in the vicinity of the EUD 401.

The EUD 401 is notified of the impending use of a frequency channel (or nearby channel) by a high power user through the EUD's connection with an AP, such as AP 201/301. As mentioned in the discussion of APs 201 and 301, the AP201/301 forwards an EUD warning signal that is received in the downlink receiver signal path beginning at the EUD 401 antenna and that is delivered to the local controller 460 by the receiver 440. In response to the EUD warning signal, the local controller 460 reacts in a similar manner as the local controllers 250 and 360 in AP 201 and AP 301, respectively. The local controller 460 causes all external communications by the transmitter 430 and receiver 440 to cease. As in each of the local controllers in the AP devices, the local controller 460 in the EUD 401 generates a protect control signal that when applied to the switch 420 will cause the switch to switch to state C. As a result of the application of the protect control signal, the switch 420 transitions to state C and a signal path from the antenna to the protection load/reflector 450 is formed. By transitioning to state C, the switch 420 disconnects the transmitter and receiver signal paths from the band pass filter 412, which protects both from possible damage. The protection load/reflector 450 is configured in the same manner as the protection load/reflector 240 in AP 201 and 350 in AP 301, and similarly protects both the receiver and the transmitter from damage. For example, in state C, a protection signal path is formed that includes either a protection load (absorptive) or a reflective, open circuit 450 as well as the antenna, switch 420 and BPF 412. In this example, the EUD 401 is disconnected from all sources of communication when in self-protect mode and the EUD 401 is configured so the protection signal path is connected.

Therefore, in order to be useable again (i.e. return from self-protect mode), the EUD 401 may emerge from the self-protect mode in various ways. For example, the controller 460 when receiving the EUD warning message, may also receive additional information regarding the high power user threat (i.e. the high power user's emission of potentially damaging high power signals in the frequency channel allocated to the AP 201/301 and the EUD 401) may be provided by the AP 201/301. The EUD warning message may, for example, include a time field that indicates an expected duration of the high power user threat. Other information may also be included such as the expected power level of the high power emissions. The local controller 460, after issuing the switch control signal that causes the switch 420 to switch to state C and, as a result, place the protection load/reflector 450 in the signal path, may initialize a timer, such as timer 490. The timer 490 may be initialized with a predetermined count value. The count value may be a set value (i.e. same time) for all devices, or may vary based on the AP 201/301 location with respect to the high power user's location, travel path through or around a coverage area, and/or parameters related to the high power user, such as expected signal power, antenna beam shape and the like.

The timer 490, for example, may be either a count up timer or a countdown timer. With regard to any type of timer, once the timer 490 completes the timing, the timer 490 provides a time out signal to the local controller 460. In response to the time out signal, the local controller 460 generates a control signal directed to the switch 420 to switch to state B or a receive (i.e. spectrum sensing) mode. The receive control signal is applied to the switch 420. In response, the switch 420 reestablishes the downlink receiver signal path.

In an alternative example, the local controller 460 may have a separate second radio receiver (not shown) set to a specific frequency in another unshared band, such as Wi-Fi, that receives wireless signals through the antenna 461. This separate radio receiver may be configured to, for example, only receive status messages. The separate radio receiver is not intended to be used with the base station 19 as a supplemental communication link between the client device 499 with the AP 301 or the communication network 17. The ASA manager 16 may transmit a status message directed to EUD 401 in received by the separate radio receiver. For example, the EUD 401 may have provided an EUD 401 identifier or address when communicating with the AP 201/301, the ASA manager 16 may have obtained this information from the AP 201/301 during the time that the AP 201/301 was connected to the EUD 401. As a result, the ASA manager 16 has an address or identifier of the EUD 401, and can direct status messages to the EUD 401 through a local wireless network, such as Wi-Fi, or Bluetooth, via an access point 19.

Since the ASA manager 16 and the AP 201/301 are the system 400 components that are most aware of the status of the high power user, the ASA manager 16 may inform the AP 201/301 that the high power user is no longer a threat. The ASA manager 16 may further inform the AP 201/301 that the allocated channel that the AP 201/301 had been using is now clear, or there is another allocated channel that is available for use by the AP 201/301. In which case, the AP 201/301, which knows the timer value of the EUD 401, can attempt to reconnect with the EUD 401 after the EUD 401 timer times out. In this case, the AP 201/301 may send a signal indicating the AP 201/301 availability for connection. Upon receipt of this signal form the AP 201/301, the EUD 401 may respond with an access request signal that initiates the establishment of a connection between the EUD 401 and the AP 201/301. Upon establishing a connection, the exchange of data between the EUD 401 and the communication network 17 can restart.

Figure 5:
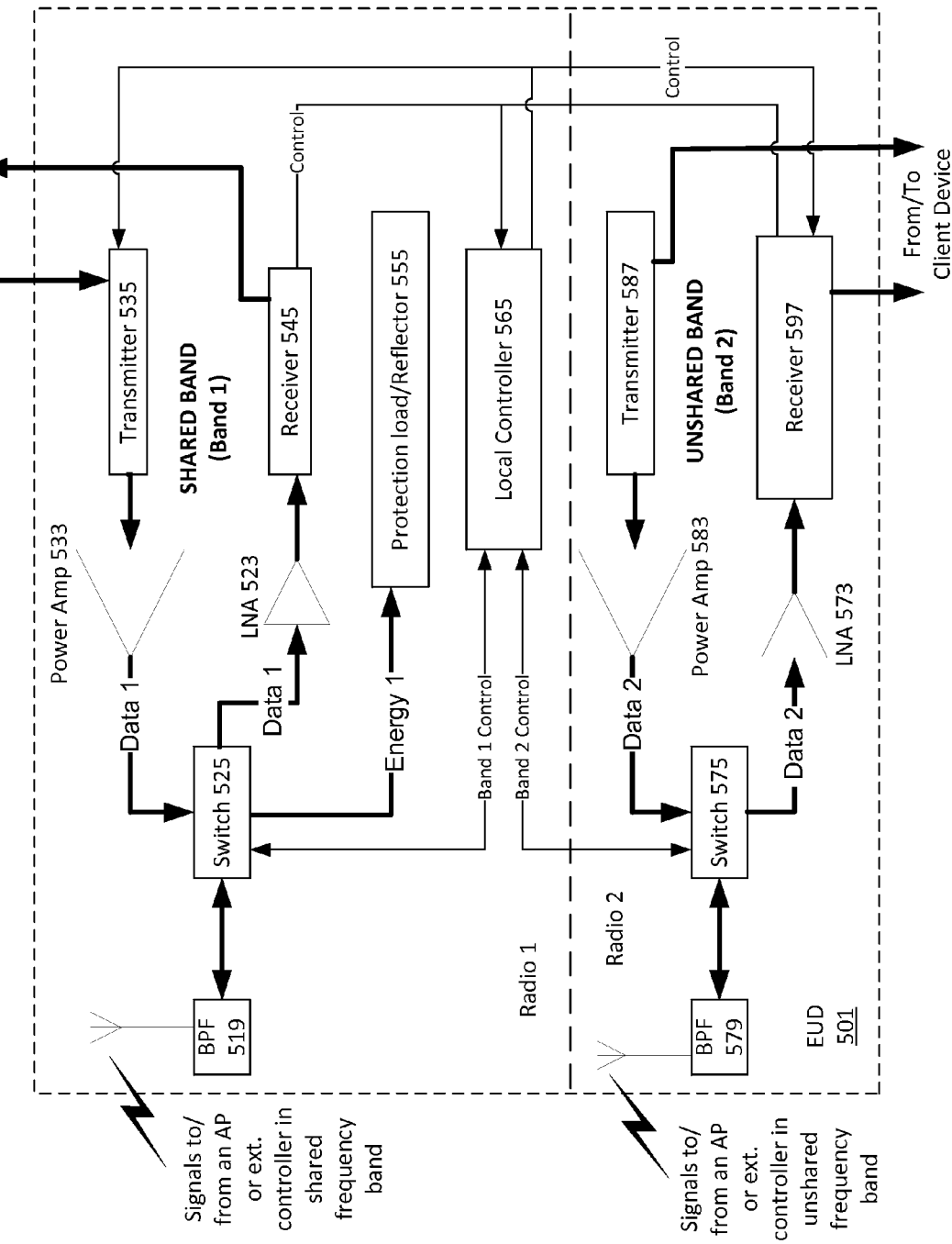
FIG. 5 is a high-level functional block diagram of another example of an End User Device that utilizes both the shared radio frequency spectrum and also another frequency band(s).

Similar to the multiband AP of FIG. 3, an EUD may also be configured with multiple radios for communicating with an AP. FIG. 5 is a high-level functional block diagram of another example of an end user device that utilizes both the shared radio frequency spectrum and also one or more other frequency bands.

The EUD 501 includes two radios: Radio 1 and Radio 2. Radio 1 operates in the shared radio frequency spectrum and is tunable to a shared radio frequency band (Band 1) of channels, while Radio 2 operates in an unshared band (Band 2) that may be a CDMA, LTE or according to some other wireless communication protocol, such as Wi-Fi, Bluetooth or the like.

Radio 1 of EUD 501 is implemented with a configuration similar to EUD 401 of FIG. 4 described above. For example, radio 1 includes similar components as EUD 401, such as band pass filter (BPF) 519 connected to an antenna, and switch 525 as well as other components that performs additional functions. For example, connected to a first signal input of the switch 525, in a transmitter signal path, are the transmitter 535 and the power amplifier 533. While connected to a second signal input of the switch 525, in the receiver signal path, are the receiver 545 and the low noise amplifier (LNA) 523. And, connected to a third signal input of the switch 525, is the protection load/reflector 555. The switch 525 also has control inputs connected to the load controller 565 for received control signals for controlling the switching between the three signal inputs. The transmitter 535 and the receiver 545 are connected to a client device (not shown). The transmitter 535 and the receiver 545 are configured to receive and transmit data between an EUD communicating with the EUD 501 in a shared frequency band and the data/communication network under control of the local controller 565. The operation of radio 1 is substantially the same as the operation of the EUD 401, and as such a detailed discussion of the operation of radio 1 will not be provided.

Meanwhile, radio 2 is configured for communication in an unshared radio frequency band, such as CDMA, LTE, Wi-Fi, Bluetooth, or some frequency other than the frequency bands of the shared radio frequency spectrum. In an example, use of radio 2 may be on a subscription basis, and, as such, a user of EUD 501 may incur charges that require payment for using radio 2 for purposes, other than emergency purposes. Radio 2 is also controlled by controller 565. Radio 2 includes an antenna, a band pass filter 579, a switch 575, a transmitter 587 coupled to power amplifier 583, and a receiver 597 coupled to a low noise amplifier (LNA) 573. Similar to the transmitter 535 and receiver 545, the transmitter 587 and receiver 597 are configured to receive and transmit data between an AP communicating with the EUD 501 in the unshared frequency (band 2) and the client device under control of the local controller 565. For example, switch 575 may be a diplexer-type switch that transitions back and forth between a transmission position (i.e. coupling transmitter 587 via the power amplifier 583 to the BPF 579 and antenna) to a receive position (i.e. coupling receiver 597 via LNA 573 to the BPF 579 and antenna) in response to control signals from the local controller 565.

Since AP 301 is a multiband AP, and configured with a unshared band radio, the following discussion with refer to AP 301. However, the EUD 501 may connect to the AP 201 in the shared band. In operation, the local controller 565 has a connection to AP 301 for receiving control signals between respective local controllers as well as a data connection for exchanging data between the client device connected to the EUD 501 and the communication network 17 connected to the AP 301. For example, the AP 301 may connect via the shared radio to the local controller 565 to inform the local controller 565 that a shared frequency band is available for use from the shared radio frequency spectrum. In addition, the AP 301 may forward indications of frequency band allocations and the like provided by ASA manager 16 to the local controller 565.

For example, when a higher power (e.g. Tier 1 military user of ship-borne radar) user needs access to a frequency channel allocated to the EUD 501 and AP 301 or may otherwise emit high powered signals that may damage the EUD 501, AP 301, in order to prevent damage to the EUD 501, forwards an EUD warning signal to the EUD 501. As, in EUD 401, the EUD 401 local controller 565 issues a protect control signal to the switch 525 to cause the switch to transition to state C, which connects the protection load/reflector 555 to the antenna via the BPF 519, and disconnects both the power amplifier 533 and LNA 523 from the antenna, thereby protecting the power amplifier 533 and LNA 523 from the high power signals.

In an example, the AP 301 also transmits an instruction, before, after or with the EUD warning signal, that includes an identifier (e.g. a web address, a cellular identifier, a frequency, or the like) of the unshared band radio of AP 301. The EUD 501 controller 565 uses the identifier to establish a connection with the unshared band radio of AP 301 using the unshared band radio (radio 2) of EUD 501.

For example, once the local controller 565 applies the protect control signal to the switch 525, the local controller 565 begins managing the communication of radio 2 via band 2 control signals to the switch 575. In an example, the local controller 565 may apply a transmit control signal to the switch 575 (which transitions to state A), which couples the transmitter 597 to the antenna. In this state, the EUD 501 is transmitting signals in the shared band (Band 2) to the AP 301 based on the identifier provided by the AP 301. The EUD 501 and the AP 301 may exchange identifying data to establish a connection. Upon establishing a connection with the AP 301, the EUD 501 and AP 301 may begin exchanging data between the client device connected to the EUD 501 and the communication network 17 (or any other type of network) connected to the AP 301 over the unshared band.

After some time, the high power user may stop using the frequency channel in the shared radio frequency spectrum. If a frequency channel becomes available in the shared band (Band 1), the AP 301 may generate a notification of the available frequency channel in the shared band, which is transmitted in the unshared band and received by the local controller 565 via the unshared receiver signal path of radio 2 in the EUD 501. The notification includes an identifier of the available frequency channel in the shared band. In the EUD 501, the local controller 565 receives the notification of the available frequency channel, and begins to transition operation from the Band 2 frequency currently being used to the available frequency channel in the shared band (Band 1).

In another example, the ASA manager 16 may contact the EUD 501 via an AP (e.g. AP 301) via the unshared band to inform the EUD 501 of the frequency channel available in the shared band (Band 1), and the identity or address of the AP that is offering the connectivity to the shared band. For example, the ASA manager 16 may have access to data records that indicate that the EUD 501 was previously connected to AP 301, and may provide the address or AP 301. However, EUD 501 may have moved since the time of the connection indicated in the data records. As a result, the EUD 501 may be closer to a different AP, such as AP 201. The EUD 501 local controller 565 may generate the appropriate control signals to initiate the establishment of a communication session with the appropriate AP over the available shared frequency channel.

In another example, the EUD 501 may have wireless connectivity to the communication network (e.g. the Internet) may be maintained by use of unshared band of operation. In which case, the EUD 501 use of the shared band as well as the control of the self-protect feature may be governed by access to the ASA or LSA system through the connection via the unshared band to the communication network. Similarly, the EUD 501 may maintain connectivity with the serving AP through the connection to the communication network via the shared band. In this case, the shared band serves as secondary access to the communication network and the ASA manager, and augments the capacity and primary access of the other shared band.

Figure 6A:
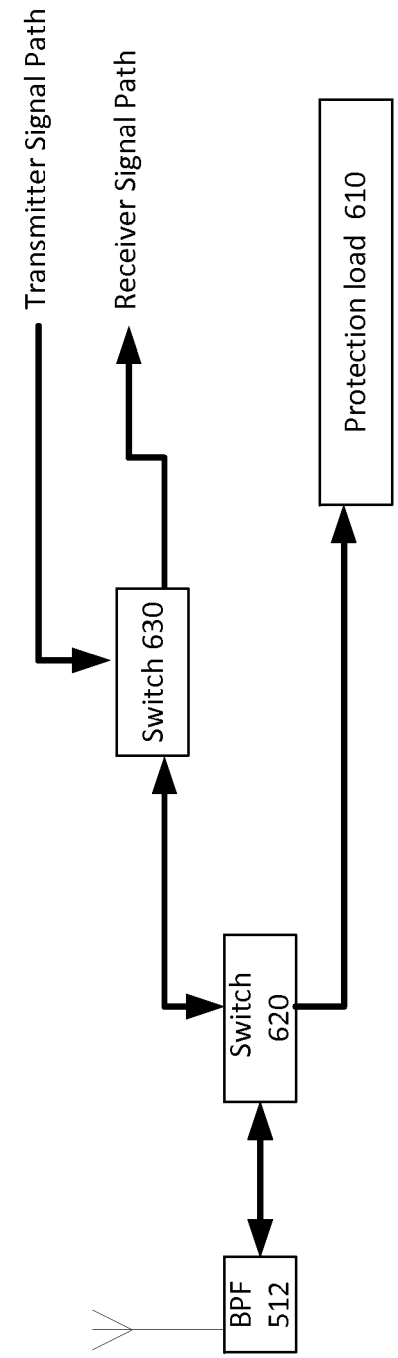
FIGS. 6A and 6B are simplified functional block diagrams of alternate configurations of signal paths in examples of an access point or an end user device implementing time division duplex (TDD) mode for bidirectional communications using multiple cascaded switches.
Figure 6B:
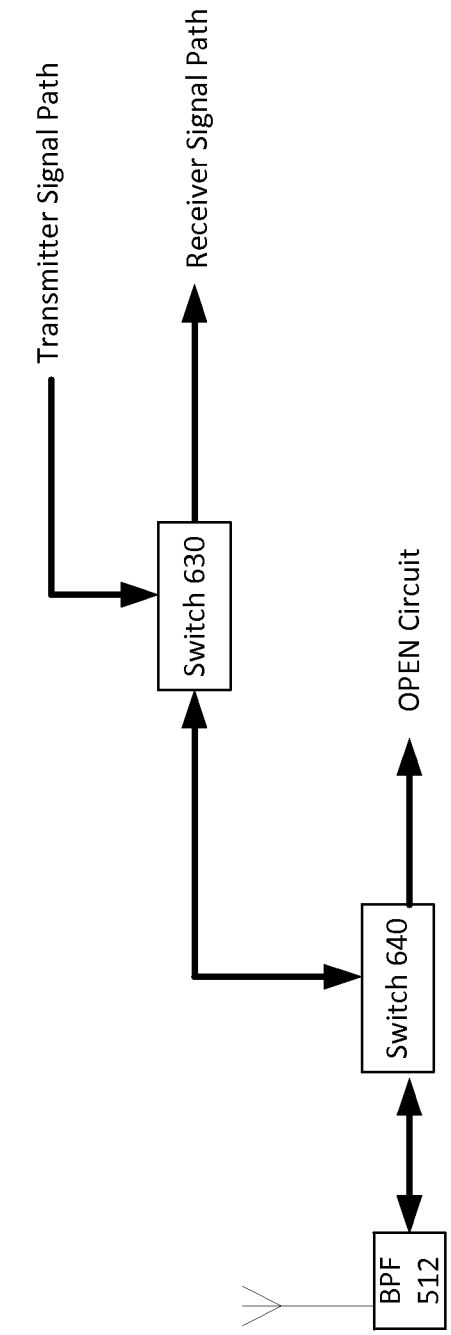

FIGS. 6A and 6B are simplified functional block diagrams of alternate signal path switching configurations in examples of an access point or an end user device implementing time division duplex (TDD) signaling in an authorized shared access system. In general, the switching complex provides switched connections for transmit functions during the TDD transmission interval, receive connections during the TDD receive interval, and 'protection' connections during the protection interval(s). The protection may be accomplished by a dummy load (absorptive load) or by a reflective (open connection that reflects energy back towards the filter and antenna). The signal paths illustrated in FIGS. 6A and 6B are implementations of receiver and transmitter that operate in a time division duplex signaling scheme. The illustrated components may be used any type of (i.e. single, shared band or multiband) AP or EUD. In contrast to the single pole triple throw (SPTT) (e.g. 3-position switch or multiplexer switch)) switches illustrated in the examples of an AP and EUD thus far (FIGS. 2-5), the switches 620 and 630 of FIG. 6A are both single pole double throw (SPDT) (e.g. 2-position switch or, also called a diplexer switch, a duplexer switch, or a multiplexer switch) switches. A single pole double throw duplexer or diplexer switch is two position switch having a "Receiver" and a "Transmitter" switch position that connects the antenna and subsequent BPF either to the LNA (receiver) or the power amplifier (transmitter). A single pole double throw switch is two position switch having an "ON" and an "OFF" position that connects the BPF 512 to an input of switch 630 or to the protection load 610. When operated switch 620 either connects or disconnects (i.e. opens) the switch 630 from the signal path controlled by switch 630, and, conversely, either disconnects or connects the protection load 610 to the BPF 512.

The protection load 610 terminates the signal path (i.e. the path from the antenna to through the switch 620) to ground through a resistance that is matched to the input impedance of the transmitter circuit or receiver circuit. While duplexer switch 630 allows the selection of transmit or receive functions. The duplexer switch 630 may be used to switch between a transmit and a receive mode.

FIG. 6B shows a similar switch configuration, however, switch 640 is different from switch 620. In this example, switch 640 is a single pole single throw (SPST) switch, which is a simple ON/OFF switch (i.e. open/closed). In the example, when the switch 640 is operated, the switch 640 either connects switch 630 to the BPF 512 (i.e. "ON"), or disconnects the switch 630 from the BPF 512 ("OFF"). In the disconnect (i.e. "OFF") position, the signal path from the antenna to the "OFF" switch 640 results in an open circuit, which reflects any signal energy obtained in the signal path. Switch 640 is switched to the "OFF" state in response to receiving a control signal indicating that the transmitter signal path and the receiver signal path need to be protected from high power users. The switch 640 and the switches in the examples shown in FIGS. 2-5 have to be properly sized to accommodate the high power user energy that is received in the signal path. While switch 630, as in FIG. 6A, is a single pole double throw (SPDT), which is two position switch that connects either the transmitter signal path or the receiver signal path to the switch 620 in response to a control signal from a controller, such as local controller 250 or 560, switch 640 may be a SPST (single pole single throw) which is either 'On' or 'Open'. The switch configurations illustrated in FIGS. 6A and 6B may be substituted for the switch configurations in the examples shown in FIGS. 2-5 in a TDD implementation. In a frequency division duplex (FDD) implementation, different types of switches may be used, but the function (e.g. protect the transmitter and receiver signal paths) is the same.

Figure 7A:
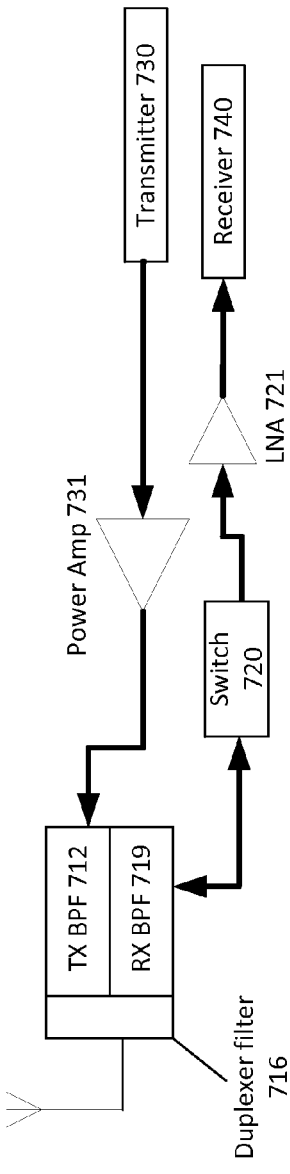
FIGS. 7A, 7B and 7C are simplified functional block diagrams of alternate configurations of signal paths in examples of an access point or an end user device implementing frequency division duplex (FDD) mode for bidirectional communications.
Figure 7B:
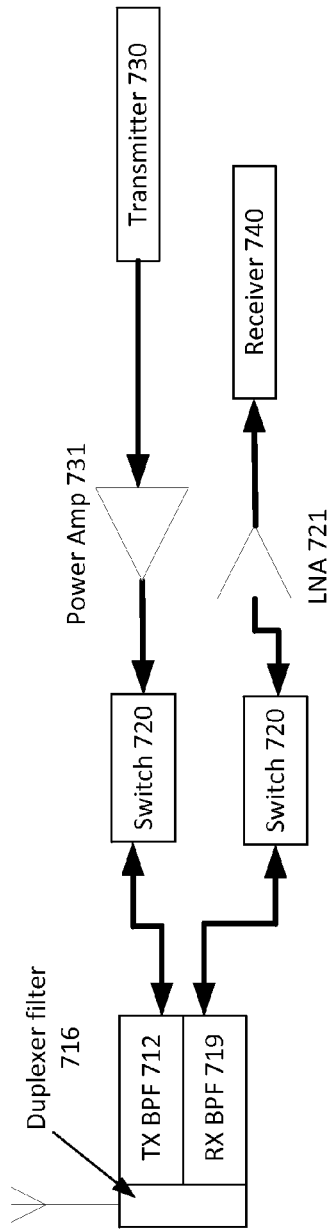
Figure 7C:
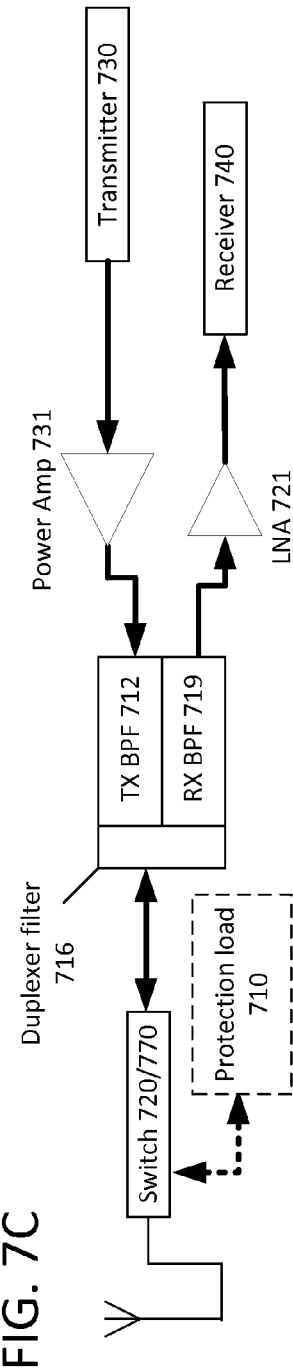

FIGS. 7A, 7B and 7C are simplified functional block diagrams of alternate configurations of signal paths in examples of an access point or an end user device implementing frequency division duplex signaling in an authorized shared access system. In FDD systems, transmitter and receiver functions operate simultaneously, and the duplexer switch or diplexer switch is replaced by a duplexer filter 716 (also known as a diplexer filter). The duplexer filter has two separate branches, one supported by a band pass filter (BPF) tuned to the transmitter band, and the second branch supported by a PBF tuned to the receiver band. The signal paths illustrated in FIGS. 7A, 7B and 7C provide a similar self-protection feature, as described above with respect to FIGS. 2-5 that is incorporated into FDD access points, or end user devices to protect either the FDD LNA, or the FDD power amplifier, or both. Here, switch(es) 720 connect components that provide absorptive or reflective protection for either reception components (the LNA and subsequent stages) and/or the power amplifier within the transmitter.

In a FDD implementation of the authorized shared access system, two frequencies are allocated to a device (e.g. an AP or an EUD), one frequency for transmitting signals and the other frequency for receiving signals. In the examples illustrated, the common components in the FDD implementation are an antenna, a duplexing filter 716, a power amplifier 731, a transmitter 730, a low noise amplifier 721, a receiver 740 and one or more switches 720. The duplexing filter 716t includes both a transmitter band pass filter (TX BPF) 712 and a receiver band pass filter (RX BPF) 719 that effectively simultaneously separates the two paths by radio frequency (rather than switching).

As in the TDD implementations, the power amplifier 731, the transmitter 730, the receiver 740 and LNA 721 are the components that are most susceptible to damage from the high power signals. In the illustrated examples of FIGS. 7A, 7B and 7C, one or more switches 720 are placed in the signal path(s) to protect one of more of the list of components that are susceptible to damage. The switch 720, in each of the examples is a single pole single throw (SPST) switch, which is a simple ON/OFF switch (i.e. off=open/on=closed).

In the example of 7A, the duplexing filter 716 is positioned so the device is receiving signals through the receiver band pass filter 719. In other words, the transmitter band pass filter 712 is disconnected from the antenna. Meanwhile, the switch 720 is positioned to protect the receive signal path containing the LNA 721 and the receiver 740. The switch 720 responds to control signals from a local controller, such as local controller 250 or 565. Switch 720 is switched to the "OFF" (open) state in response to receiving a control signal indicating the threat of high power users. When the switch 720 is in the closed (i.e. "ON") position, the switch 720 connects the RX BPF 719 to the LNA 721 thereby enabling signals to be passed to the receiver from the RX BPF 719. Conversely, in the open (i.e. "OFF") position, the switch 720 disconnects the RX BPF 719 from the LNA 721 thereby protecting the LNA 721 by reflecting within the switch 720 any high power energy that may be received via the antenna.

In the example of FIG. 7B, a pair of switches 720 may be used to protect each of the transmit signal path and the receive signal path. A first switch 720 of the pair of switches may be inserted between the band pass filter be connected between the band pass filter and the respective. Each of the switches 720 may be under control of a local controller. The first of the pair of switches 720 is positioned to protect the receive signal path containing the LNA 721 and the receiver 740. The switch 720 responds to control signals from a local controller, such as local controller 250 or 565. Switch 720 is switched to the "OFF" state in response to receiving a control signal indicating the threat of high power users. When the switch 720 is in the closed (i.e. "ON") position, the switch 720 connects the RX BPF 719 to the LNA 721 thereby enabling signals to be passed to the receiver from the RX BPF 719. Conversely, in the open (i.e. "OFF") position, the switch 720 disconnects the RX BPF 719 from the LNA 721 thereby protecting the LNA 721 by reflecting within the switch 720 any high power energy that may be received via the antenna. The second switch of the pair of switches 720 is positioned between the TX BPF 712 and the power amplifier 731. The second switch also responds to a control signal from a local controller, the control signal may be the same or different from the control signal transmitted to the first switch of the pair of switches 720. The pair of switches 720 protect the respective power amplifier 731 and LNA 721 by reflecting any energy received from an high power user.

In each of the examples illustrated in FIGS. 2-7B, the band pass filters (BPF) are not protected because the passive BPF components are typically rugged enough to be undamaged by the energy emitted by the high power users, as is the antenna itself. As a result, only the example of FIG. 7C illustrates a configuration in which the protection switch is positioned in front of the BPF in the signal path so that the single switch may simultaneously protect both the subsequent transmitter path and the subsequent receiver path. Again, the switch 720/770 may be a SPST type of switch (reflective open) or a SPDT type of switch connected to an absorptive load to absorb the unwanted energy while in the self-protect mode.

The example of FIG. 7C shows the use of two different types of switches 720 or 770. The switch 720 is a single pole single throw switch (SPST) as described with respect to FIGS. 7A and 7B, while switch 770 is a single pole double throw (SPDT) as described with respect to switch 620 of FIG. 6A.

In the example of FIG. 7C, the switch 720/770 is placed before the duplexer filter 716 of the TX BPF 712 and RX BPF 719. When the switch 720/770 has the configuration of a single pole single throw switch (SPST) (i.e. switch 720), the entire signal path (both receiver signal path and transmitter signal path) is protected. In the case of using a SPST switch 720, the energy from the high power user, if received at the antenna is reflected from the open circuit created by switch 720. In operation, the switch 720 responds to a control signal that either opens (i.e. an open circuit) the switch to protect the transmit/receive circuit components, or closes the switch 720 to allow the circuits to operate normally.

Alternatively, if a switch, such as switch 770 (i.e. SPDT), is used to protect the circuit components, the switch 770 either connects the antenna to the duplexer filter 716 and subsequently to the transmit/receive circuit components, or in the self-protection mode the switch connects the antenna to the protection load 710. The protection load 710 terminates the signal path (i.e. the path from the antenna to and through the switch 770) to ground through a resistance (or an impedance) that is matched to the input impedance of the transmitter circuit or receiver circuit. In operation, the switch 770 responds to a control signal that either connects to the absorptive load to protect the circuit components, or connects to the duplexer filter to allow the circuit to operate normally. Note that the terms "duplexing", "diplexing" or "multiplexing" may refer to forms of switching and filtering.

In summary, the example of FIG. 7A provides protection to the LNA 721 and receiver 740. In the example of FIG. 7B, the pair of switches 720 protect both the LNA 721 and receiver 740 and the power amplifier 731 and transmitter 730. And, in the example of FIG. 7C, the switch, whether a switch 720 or switch 770, protects the duplexing filter 716 band pass filter 712/719, the LNA 721, receiver 740, the power amplifier 731 and transmitter 730.

Note that discussion of the FIGS. 1-8 primarily refers to time division duplex (TDD) communications, but as discussed with respect to FIGS. 7A-7C, the example devices (e.g. AP 201) may be configured for frequency division duplexing (FDD). The difference is illustrated in more detail with reference to FIGS. 7A-7C, where in the FDD implementations, the transmit frequency and the receive frequency are different, so a filter may provide the duplexing function. Also, the tuning of the simultaneous transmitter synthesizer and the receiver synthesizer will be different to correspond to the two different frequencies used. In FDD systems, each nominal channel is actually a pair of channels, one channel for the uplink and one channel for the downlink. As a result, in FDD, the respective transmitter 210 and receiver 230 tuning synthesizers, and signals to the transmitter 210 and the receiver 230 will be different.

Figure 8:
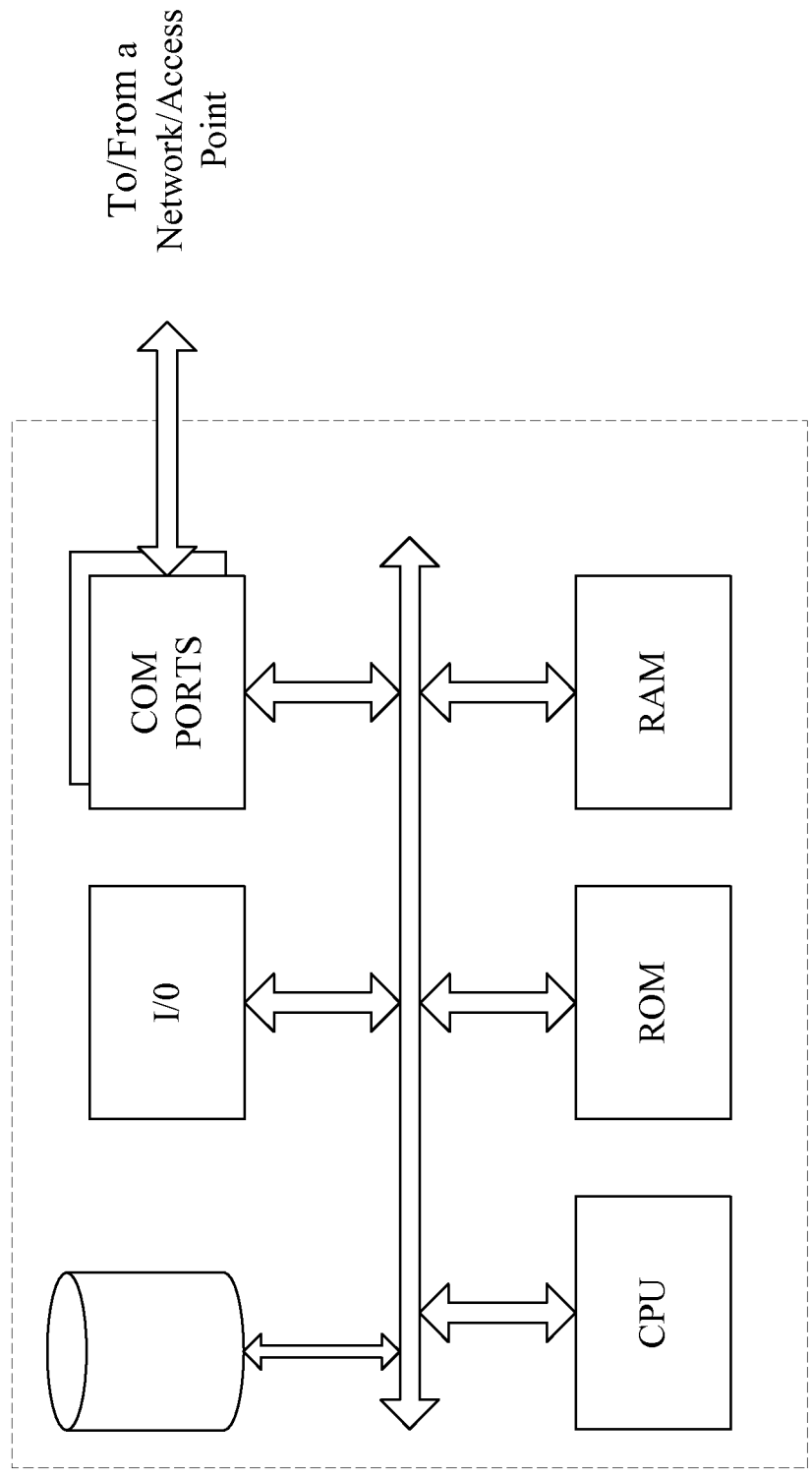
FIG. 8 provides a functional block diagram illustration of a general purpose computer hardware platforms for implementing one or more of the examples of a local controller or the ASA manager in an authorized shared access system.

FIG. 8 provides a functional block diagram illustration of a general purpose computer hardware platforms for implementing one or more of the examples of a local controller or the ASA manager.

A general purpose computer configured to operate as a manager or controller device within an access device or end user device, for example, includes a data communication interface for packet data communication. The device also includes a central processing unit (CPU), in the form of one or more processors, for executing program instructions. The device platform typically includes an internal communication bus, program storage and data storage for various data files to be processed and/or communicated by the device, although the device often receives programming and data via network communications. The hardware elements, operating systems and programming languages of such devices are conventional in nature. Of course, the device functions may be implemented in a distributed fashion on a number of similar platforms, to distribute the processing load.

Hence, aspects of the methods of shared radio frequency spectrum access outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the authorized shared access system 110 into the computer platform of the ASA manager 16, access point and end user device that will allow the end user device to access a data network through an access point controlled by the ASA manager 16. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the ASA controller, access point and/or end user device. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a processor of a protected device, an indication of a frequency channel selected from a plurality of frequency channels available in a shared radio frequency spectrum band, the protected device sharing the frequency channel with other devices;

sending, by the processor, a tuning instruction containing the indication of the frequency channel to a transmitter, the transmitter being tuned to the frequency channel;

applying, by the processor, a transmit control signal to a first control input of a switch system of the protected device;

transmitting, by the processor and via a transmitter signal path, signals in the frequency channel from the transmitter to another device, of the other devices, sharing the frequency channel;

receiving, by the processor and from an access point device, a notification that the other device is preparing to use the frequency channel;

generating, by the processor and based on receiving the notification, a self-protection control signal;

providing, by the processor, the self-protection control signal to a second control input of the switch system;

opening, by the processor and based on providing the self-protection control signal to the switch system, the transmitter signal path, a connection between the transmitter and an antenna being broken; and completing, by the processor, a protect signal path through the switch system.

2. The method of claim 1, further comprising:
receiving a notification that the other device is no longer using the frequency channel; and
transmitting, based on receiving the notification that the other device is no longer using the frequency channel, a request to an external manager for access on an available frequency channel.

3. The method of claim 1, further comprising:
receiving a high power signal from the other device at the antenna; and
passing, based on receiving the high power signal, the received high power signal through the switch system to a protective load.

4. The method of claim 1, further comprising:
sending, based on receiving the notification, instructions to an end user device,
the instructions including:
an end user device identifier,
an indication to the end user device to switch into self-protection mode, and
information indicating a wait period duration during which the end user device is to remain in the self-protection mode.

5. The method of claim 1, further comprising:
sending, based on receiving the notification, instructions to an end user device,
the instructions including an identifier of a secondary radio frequency band usable for communicating in a presence of high power signals emitted by the other device;
coupling a receiver in the secondary radio frequency band to a secondary radio antenna;
receiving, using the receiver in the secondary radio frequency band, a request for access from the end user device; and
providing access to the end user device via the secondary radio frequency band.

6. The method of claim 5, where the secondary radio frequency band is used to transfer data between the end user device and an access point when data is transmitted using the frequency channel.

7. A protected device comprising:
a memory to store instructions; and
a processor to execute the instructions to:
receive an indication of a frequency channel selected from a plurality of frequency channels available in a shared radio frequency spectrum band,
the protected device sharing the frequency channel with other devices;
send a tuning instruction containing the indication of the frequency channel to a transmitter,
the transmitter being tuned to the frequency channel;
apply a transmit control signal to a first control input of a switch system of the protected device;
transmit, and via a transmitter signal path, signals in the frequency channel from the transmitter to another device, of the other devices, sharing the frequency channel;
receive, from an access point device, a notification that the other device is preparing to use the frequency channel;
generate, based on receiving the notification, a self-protection control signal;
provide the self-protection control signal to a second control input of the switch system;
open, based on providing the self-protection control signal to the switch system, the transmitter signal path,
a connection between the transmitter and an antenna being broken; and
complete a protect signal path through the switch system.

8. The protected device of claim 7, where the processor is further to:
receive a notification that the other device is no longer using the frequency channel; and
transmit, based on receiving the notification that the other device is no longer using the frequency channel, a request to an external manager for access on an available frequency channel.

9. The protected device of claim 7, where the processor is further to:
receive a high power signal from the other device at the antenna; and
pass, based on receiving the high power signal, the received high power signal through the switch system to a protective load.

10. The protected device of claim 7, where the processor is further to:
send, based on receiving the notification, instructions to an end user device.

11. The protected device of claim 10, where the instructions include:
an end user device identifier,
an indication to the end user device to switch into self-protection mode, and
information indicating a wait period duration during which the end user device is to remain in the self-protection mode.

12. The protected device of claim 7, where the processor is further to:
send, based on receiving the notification, instructions to an end user device,
the instructions including an identifier of a secondary radio frequency band usable for communicating in a presence of high power signals emitted by the other device;
couple a receiver in the secondary radio frequency band to a secondary radio antenna;

receive, using the receiver in the secondary radio frequency, a request for access from the end user device; and provide access to the end user device via the secondary radio frequency band.

13. The protected device of claim 12, where the secondary radio frequency band is used to transfer data between the end user device and an access point when data is transmitted using the frequency channel.

14. A non-transitory computer readable medium storing instructions, the instructions comprising:
one or more instructions which, when executed by a processor of a protected device, cause the processor to:
receive an indication of a frequency channel selected from a plurality of frequency channels available in a shared radio frequency spectrum band,
the protected device sharing the frequency channel with other devices;
send a tuning instruction containing the indication of the frequency channel to a transmitter,
the transmitter being tuned to the frequency channel;
apply a transmit control signal to a first control input of a switch system of the protected device;
transmit, and via a transmitter signal path, signals in the frequency channel from the transmitter to another device, of the other devices, sharing the frequency channel;
receive, from an access point device, a notification that the other device is preparing to use the frequency channel;
generate, based on receiving the notification, a self-protection control signal;
provide the self-protection control signal to a second control input of the switch system;
open, based on providing the self-protection control signal to the switch system, the transmitter signal path, a connection between the transmitter and an antenna being broken; and
complete a protect signal path through the switch system.

15. The computer readable medium of claim 14, where the instructions further include:
one or more instructions to receive a notification that the other device is no longer using the frequency channel; and
one or more instructions to transmit, based on receiving the notification that the other device is no longer using the frequency channel, a request to an external manager for access on an available frequency channel.

16. The computer readable medium of claim 14, where the instructions further include:
one or more instructions to receive a high power signal from the other device at the antenna; and
one or more instructions to pass, based on receiving the high power signal, the received high power signal through the switch system to a protective load.

17. The computer readable medium of claim 14, where the instructions further include:
one or more instructions to send, based on receiving the notification, particular instructions to an end user device.

18. The computer readable medium of claim 17, where the particular instructions include:
an end user device identifier,
an indication to the end user device to switch into self-protection mode, and
information indicating a wait period duration during which the end user device is to remain in the self-protection mode.

19. The computer readable medium of claim 14, where the instructions further include:
one or more instructions to send, based on receiving the notification, instructions to an end user device,
the instructions including an identifier of a secondary radio frequency band usable for communicating in a presence of high power signals emitted by the other device;
one or more instructions to couple a receiver in the secondary radio frequency band to a secondary radio antenna;
one or more instructions to receive, using the receiver in the secondary radio frequency, a request for access from the end user device; and
one or more instructions to provide access to the end user device via the secondary radio frequency band.

20. The computer readable medium of claim 19, where the secondary radio frequency band is used to transfer data between the end user device and an access point when data is transmitted using the frequency channel.

* * * * *